US012763335B2

(12) United States Patent
Horikawa et al.

(10) Patent No.: US 12,763,335 B2

(45) **Date of Patent: *Oct. 13, 2026**

(54) LAYERED BODY, NEGATIVE ELECTRODE CURRENT COLLECTOR FOR LITHIUM ION SECONDARY BATTERY, AND NEGATIVE ELECTRODE FOR LITHIUM ION SECONDARY BATTERY

(71) Applicant: TDK CORPORATION, Tokyo (JP)

(72) Inventors: Yuhei Horikawa, Tokyo (JP); Makoto Endo, Tokyo (JP); Takuya Kakiuchi, Tokyo (JP); Miyuki Yanagida, Tokyo (JP); Yuki Naito, Tokyo (JP); Takahiro Tashiro, Tokyo (JP)

(73) Assignee: TDK CORPORATION, Tokyo (JP)

( * ) Notice: Subject to any disclaimer, the term of this patent is extended or adjusted under 35 U.S.C. 154(b) by 599 days.

This patent is subject to a terminal disclaimer.

(21) Appl. No.: 18/268,640

(22) PCT Filed: Dec. 16, 2021

(86) PCT No.: PCT/JP2021/046593

§ 371 (c)(1),
(2) Date: Jun. 21, 2023

(87) PCT Pub. No.: WO2022/158188

PCT Pub. Date: Jul. 28, 2022

(65) Prior Publication Data

US 2024/0047694 A1 Feb. 8, 2024

(30) Foreign Application Priority Data

Jan. 20, 2021 (JP) ................................ 2021-007180

(51) Int. Cl.

| | |
|---|---|
| ***H01M 4/66*** | (2006.01) |
| ***H01M 4/02*** | (2006.01) |
| ***H01M 4/134*** | (2010.01) |

(52) U.S. Cl.

CPC .......... *H01M 4/667* (2013.01); *H01M 4/134* (2013.01); *H01M 4/662* (2013.01); *H01M 2004/021* (2013.01); *H01M 2004/027* (2013.01)

(58) Field of Classification Search

CPC ...... H01M 4/667; H01M 4/134; H01M 4/662; H01M 2004/021; H01M 2004/027;

(Continued)

(56) References Cited

U.S. PATENT DOCUMENTS

2021/0175513 A1 6/2021 Horie et al.
2022/0127743 A1* 4/2022 Kaidi .................... B32B 15/01

FOREIGN PATENT DOCUMENTS

JP H02-194182 A 7/1990
JP 2005-197205 A 7/2005

(Continued)

OTHER PUBLICATIONS

English translation of JP-2013077462-A (Year: 2013).*

(Continued)

*Primary Examiner* — Ula C Ruddock
*Assistant Examiner* — Sarika Gupta
(74) *Attorney, Agent, or Firm* — Oliff PLC

(57) ABSTRACT

A laminated body contains a first metal layer containing copper and a second metal layer containing nickel and laminated directly on the first metal layer. A first surface of the second metal layer is a surface in contact with the first metal layer. A second surface of the second metal layer is a reverse surface of the first surface. A thickness direction of the second metal layer is a direction approximately perpendicular to the first surface and oriented from the first surface toward the second surface. A unit of a content of nickel in (Continued)

the second metal layer is % by mass. The content of nickel in the second metal layer increases along the thickness direction.

8 Claims, 4 Drawing Sheets

(58) Field of Classification Search
CPC .......... H01M 4/38; H01M 4/661; H01M 4/66; Y02E 60/10; B32B 15/01
See application file for complete search history.

(56) References Cited

FOREIGN PATENT DOCUMENTS

| | | | | |
|---|---|---|---|---|
| JP | 2013-77462 | A | | 4/2013 |
| JP | 2013077462 | A | * | 4/2013 |
| JP | 2019-186134 | A | | 10/2019 |

OTHER PUBLICATIONS

Feb. 15, 2022 International Search Report issued in International Patent Application No. PCT/JP2021/046593.
Jul. 20, 2023 International Preliminary Report on Patentability issued in International Patent Application No. PCT/JP2021/046593.

* cited by examiner

LAYERED BODY, NEGATIVE ELECTRODE CURRENT COLLECTOR FOR LITHIUM ION SECONDARY BATTERY, AND NEGATIVE ELECTRODE FOR LITHIUM ION SECONDARY BATTERY

TECHNICAL FIELD

The present disclosure relates to a laminated body, a negative electrode current collector for a lithium ion secondary battery, and a negative electrode for a lithium ion secondary battery.

BACKGROUND ART

A negative electrode current collector for a lithium ion secondary battery is subjected to repetitive loads (compressive stress and tensile stress) due to volume fluctuating of a negative electrode active material layer laminated on the negative electrode current collector along with charging and discharging. Deformation of the negative electrode current collector due to these loads causes deformation of a battery main body or short-circuit between electrodes. Therefore, the negative electrode current collector is required to have durability (high tensile strength) against the loads (particularly, tensile stress). For example, Patent Literature 1 below discloses a negative electrode current collector in which an electrode foil and a hard nickel plating layer are laminated, as a negative electrode current collector having tensile strength. Patent Literature 2 below discloses a current collector in which a first metal layer consisting of copper and a second metal layer consisting of nickel or a nickel alloy are laminated, as a current collector having a sufficient strength for suppressing cracking or ripping.

CITATION LIST

Patent Literature

Patent Literature 1: Japanese Unexamined Patent Publication No. 2005-197205

Patent Literature 2: Japanese Unexamined Patent Publication No. 2019-186134

SUMMARY OF INVENTION

Technical Problem

In a case where a laminated body composed of a plurality of metal layers is subjected to tensile stress, cracks are formed in the metal layers and the cracks expand and propagate. Due to the expansion and propagation of cracks, the metal layer or the laminated body breaks.

An object of one aspect of the present invention is to provide a laminated body having a high tensile strength, a negative electrode current collector and a negative electrode for a lithium ion secondary battery, both of which contain the laminated body.

Solution to Problem

A laminated body according to one aspect of the present invention contains a first metal layer containing copper and a second metal layer containing nickel and laminated directly on the first metal layer, a first surface of the second metal layer is a surface in contact with the first metal layer, a second surface of the second metal layer is a reverse surface of the first surface, a thickness direction of the second metal layer is a direction approximately perpendicular to the first surface and oriented from the first surface toward the second surface, a unit of a content of nickel in the second metal layer is % by mass, and the content of nickel in the second metal layer increases along the thickness direction.

The second metal layer may further contain at least one element selected from the group consisting of phosphorus and tungsten.

The second metal layer may consist of a plurality of nickel-containing layers laminated in the thickness direction, and a content of nickel in each of the plurality of nickel-containing layers may be different from each other.

A thickness of the first metal layer is represented by T1, a thickness of the second metal layer is represented by T2, and T2/T1 may be 0.6 or more and 1.0 or less.

The content of nickel in the second metal layer may be the lowest in the vicinity of the first surface, may increase stepwise along the thickness direction, and may be the highest in the vicinity of the second surface.

The content of nickel in the second metal layer may be the lowest in the vicinity of the first surface, may increase continuously along the thickness direction, and may be the highest in the vicinity of the second surface.

A negative electrode current collector for a lithium ion secondary battery according to one aspect of the present invention contains the above-described laminated body.

A negative electrode for a lithium ion secondary battery according to one aspect of the present invention contains the above-described negative electrode current collector and a negative electrode active material layer containing a negative electrode active material, and the negative electrode active material layer is laminated directly on the second surface of the second metal layer.

The negative electrode active material may contain silicon.

Advantageous Effects of Invention

According to one aspect of the present invention, there are provided a laminated body having a high tensile strength, a negative electrode current collector and a negative electrode for a lithium ion secondary battery, both of which contain the laminated body.

DESCRIPTION OF EMBODIMENTS

Figure 1:
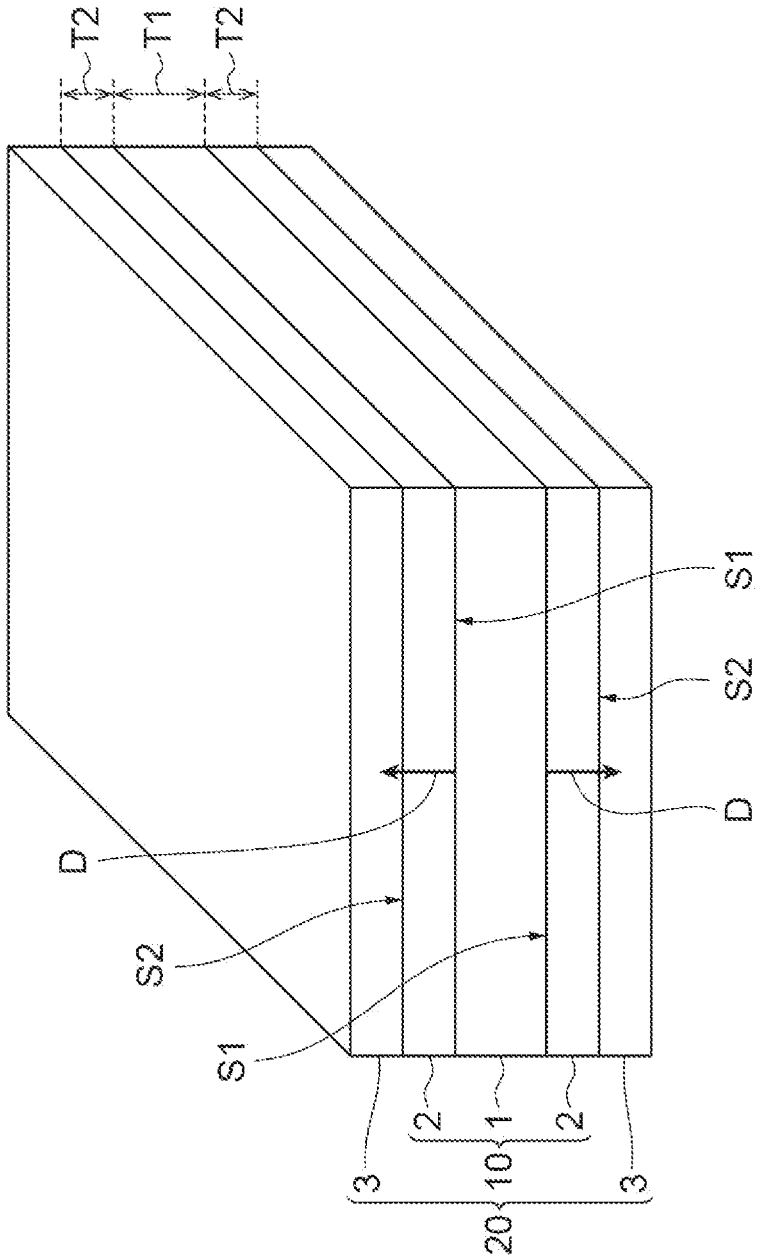
FIG. 1 is a schematic perspective view of a laminated body (negative electrode current collector) according to an embodiment of the present invention and a negative electrode containing the laminated body.

Preferred embodiments of the present invention will be described below with reference to the drawings. In the drawings, the equivalent constituent elements are designated by the same reference numerals. The present invention is not limited to the following embodiments.

A laminated body according to the present embodiment is a negative electrode current collector for a lithium ion secondary battery. As shown in FIG. 1, a laminated body 10 according to the present embodiment has a first metal layer 1 and second metal layers 2. The first metal layer 1 contains copper (Cu). The second metal layer 2 contains nickel (Ni). In the case of the laminated body 10 illustrated in FIG. 1, each of the second metal layers 2 is laminated directly on both surfaces of the first metal layer 1. However, the second metal layer 2 may be laminated directly on only one surface of the first metal layer 1. A first surface S1 of the second metal layer 2 is a surface in contact with the first metal layer 1. The first surface S1 of the second metal layer 2 may be rephrased as an interface between the first metal layer 1 and the second metal layer 2. A second surface S2 of the second metal layer 2 is a reverse surface of the first surface S1. A thickness direction D of the second metal layer 2 is a direction approximately perpendicular to the first surface S1 and is oriented from the first surface S1 toward the second surface S2.

As illustrated in FIG. 1, a negative electrode 20 for a lithium ion secondary battery according to the present embodiment has the laminated body 10 (negative electrode current collector) and negative electrode active material layers 3. The negative electrode active material layer 3 contains a negative electrode active material. The negative electrode active material layer 3 is laminated directly on the second surface S2 of each of the second metal layers 2.

A lithium ion secondary battery according to the present embodiment may contain the negative electrode 20, a positive electrode, a separator, and an electrolyte solution. The separator and the electrolyte solution are disposed between the negative electrode 20 and the positive electrode. The electrolyte solution permeates the separator. The positive electrode may contain a positive electrode current collector and a positive electrode active material layer laminated on the positive electrode current collector. For example, the positive electrode current collector may be an aluminum foil or a nickel foil. The positive electrode active material layer contains a positive electrode active material. For example, the positive electrode active material may be one or more compounds selected from the group consisting of lithium cobaltate ($LiCoO_2$), lithium nickelate ($LiNiO_2$), lithium manganate ($LiMnO_2$), lithium manganese spinel ($LiMn_2O_4$), $LiNi_xCo_yMn_zM_aO_2$ ($x+y+z+a=1$, $0 \le x < 1$, $0 \le y < 1$, $0 \le z < 1$, $0 \le a < 1$, M is one or more elements selected from the group consisting of Al, Mg, Nb, Ti, Cu, Zn, and Cr), a lithium vanadium compound ($LiV_2O_5$), olivine-type $LiMPO_4$ (M is one or more elements selected from the group consisting of Co, Ni, Mn, Fe, Mg, Nb, Ti, Al, and Zr, or VO), lithium titanate ($Li_4Ti_5O_{12}$), $LiNi_xCo_yAl_zO_2$ ($0.9 < x+y+z < 1.1$), polyacetylene, polyaniline, polypyrrole, polythiophene, and polyacene. The positive electrode active material layer may further contain a conductive aid such as carbon or metal powder. The positive electrode active material layer may further contain a binder (an adhesive or a resin). The separator may be one or more membranes (film or laminated body) formed from a porous polymer having an electrical insulation property. The electrolyte solution contains a solvent and an electrolyte (lithium salt). The solvent may be water or an organic solvent. For example, the electrolyte (lithium salt) may be one or more lithium compounds selected from the group consisting of $LiPF_6$, $LiClO_4$, $LiBF_4$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and LiBOB.

Figure 2:
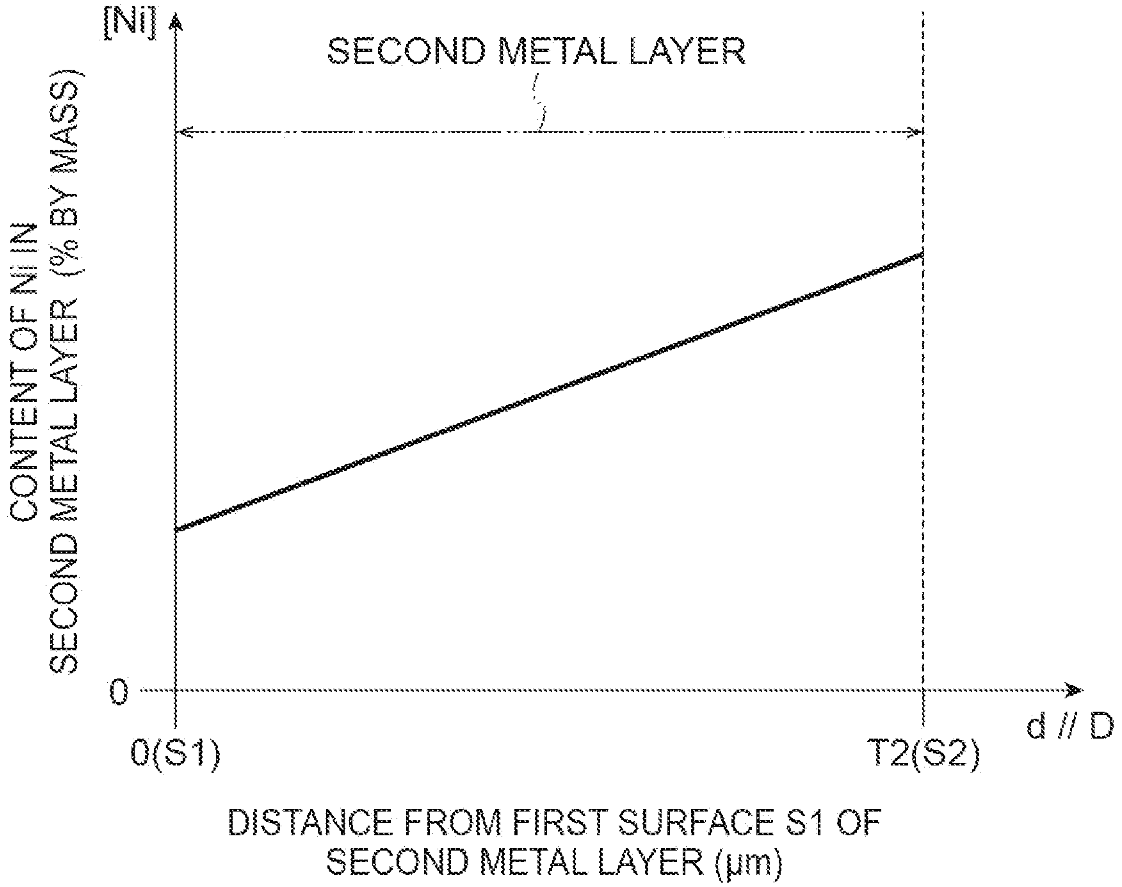
FIG. 2 is a graph showing an example of a distribution of a content of nickel in a second metal layer.

A unit of a content of Ni in the second metal layer 2 is % by mass. The content of Ni in the second metal layer 2 increases along the thickness direction D of the second metal layer 2. That is, the content of Ni in the second metal layer 2 is the lowest in the vicinity of the first surface S1, increases gradually or stepwise from the first surface S1 toward the second surface S2, and is the highest in the vicinity of the second surface S2. The graph of FIG. 2 shows an example of a distribution of the content of Ni in the second metal layer 2. A horizontal axis of the graph of FIG. 2 is a distance d from the first surface S1 in the thickness direction D of the second metal layer 2. A vertical axis of the graph of FIG. 2 is the content of Ni ([Ni]) at a position where a distance from the first surface S1 in the second metal layer 2 is d. As shown in FIG. 2, the content of Ni in the second metal layer 2 may continuously (gradually) increase along the thickness direction D. The distribution of the content of Ni in the second metal layer 2 may be represented by a straight line. The distribution of the content of Ni in the second metal layer 2 may be represented by a curve.

By the content of Ni in the second metal layer 2 increasing along the thickness direction D, the laminated body 10 can have a high tensile strength. The tensile strength means a durability of the laminated body 10 against the tensile stress in a direction parallel to the surface of the second metal layer 2. The mechanism by which the laminated body 10 has the high tensile strength is as follows. However, the following mechanism is a hypothesis, and the technical scope of the present invention is not limited by the following mechanism.

Since the laminated body 10 has not only the first metal layer 1 but also the second metal layer 2 laminated on the first metal layer 1, the laminated body 10 can have the higher tensile strength than that of a conventional current collector consisting of only one metal layer containing Cu. However, the high tensile strength of the laminated body 10 is attributable to not only the laminated structure but also the content of Ni increasing along the thickness direction D in the second metal layer 2.

As the content of Ni in the second metal layer 2 is higher, an elastic modulus of the second metal layer 2 is lower. As the elastic modulus of the second metal layer 2 is lower, the second metal layer 2 is softer. Therefore, as the elastic modulus of the second metal layer 2 is lower, the second metal layer 2 is likely to deform due to the tensile stress, and cracks and breakage in the second metal layer 2 associated with the deformation of the second metal layer 2 are likely to be suppressed.

On the other hand, as the content of Ni in the second metal layer 2 is lower, the elastic modulus of the second metal layer 2 is higher. As the elastic modulus of the second metal layer 2 is higher, the second metal layer 2 is harder. Therefore, as the elastic modulus of the second metal layer 2 is higher, the second metal layer 2 is less likely to deform due to the tensile stress, and cracks and breakage in the second metal layer 2 associated with the deformation of the second metal layer 2 are likely to occur.

Since the content of Ni in the second metal layer 2 increases along the thickness direction D, the elastic modulus of the second metal layer 2 decreases along the thickness direction D. That is, the elastic modulus of the second metal layer 2 is the highest in the vicinity of the first surface S1, decreases gradually or stepwise from the first surface S1 toward the second surface S2, and is the lowest in the vicinity of the second surface S2. Therefore, the second surface S2 having the lowest elastic modulus in the second metal layer 2 is in contact with the negative electrode active material layer 3. As a result, the second metal layer 2 is easily deformed due to the tensile stress repeatedly acting on the second surface S2 due to volume fluctuation of the negative electrode active material layer 3, and cracks and breakage in the second metal layer 2 associated with the deformation of the second metal layer 2 are suppressed. That is, the second surface S2 side, which is easily deformed due to the volume fluctuation of the negative electrode active material layer 3, has a sufficiently low elastic modulus for suppressing cracks and breakage associated with the deformation, and the first surface S1 side, which is less susceptible to the volume fluctuation of the negative electrode active material layer 3 has sufficient hardness (high elastic modulus), so that the second metal layer 2 as a whole achieves a sufficiently high tensile strength. In other words, as the elastic modulus of the second metal layer 2 decreases gradually or stepwise from the first surface S1 toward the second surface S2, the stress acting on the second metal layer 2 due to the volume fluctuation of the negative electrode active material layer 3 is dispersed, and cracks and breakage in the second metal layer 2 associated with the deformation of the second metal layer 2 are suppressed.

In order to increase an energy density of a lithium ion secondary battery, a negative electrode contained in a package of the battery is wound into a roll form or is folded, in a state of being laminated with a separator, an electrolyte, and a positive electrode. Since the stress is likely to act on a folded portion in the laminated body (negative electrode current collector) constituting the negative electrode, cracks and breakage are likely to occur at the folded portion in the conventional laminated body. On the other hand, since the laminated body 10 according to the present embodiment has a high mechanical strength (particularly, tensile strength), cracks and breakage at the folded portion in the laminated body 10 are suppressed.

The second metal layer 2 may consist of a plurality of nickel-containing layers laminated in the thickness direction D, and a content of Ni in each of the plurality of nickel-containing layers may be different from each other. In other words, the plurality of nickel-containing layers may be distinguished from each other based on the contents of Ni. The content of Ni may be constant in each of the nickel-containing layers. The content of Ni may increase along the thickness direction D in each of the nickel-containing layers. A thickness of each nickel-containing layer may be uniform. The number "n" of nickel-containing layers constituting the second metal layer 2 is an integer of 2 or more, and is not particularly limited. For example, any pair of nickel-containing layers constituting the second metal layer 2 is represented as the (k−1)-th nickel-containing layer and the k-th nickel-containing layer. "k" is any integer of 2 or more and n or less. The k-th nickel-containing layer is laminated directly on the (k−1)-th nickel-containing layer in the thickness direction D of the second metal layer 2. When "k" is 2, the (k−1)-th nickel-containing layer (that is, a first nickel-containing layer) is laminated directly on the first metal layer 1. A distance between the first metal layer 1 and the k-th nickel-containing layer is larger than a distance between the first metal layer 1 and the (k−1)-th nickel-containing layer, and the content of Ni in the k-th nickel-containing layer is higher than the content of Ni in the (k−1)-th nickel-containing layer.

Figure 3:
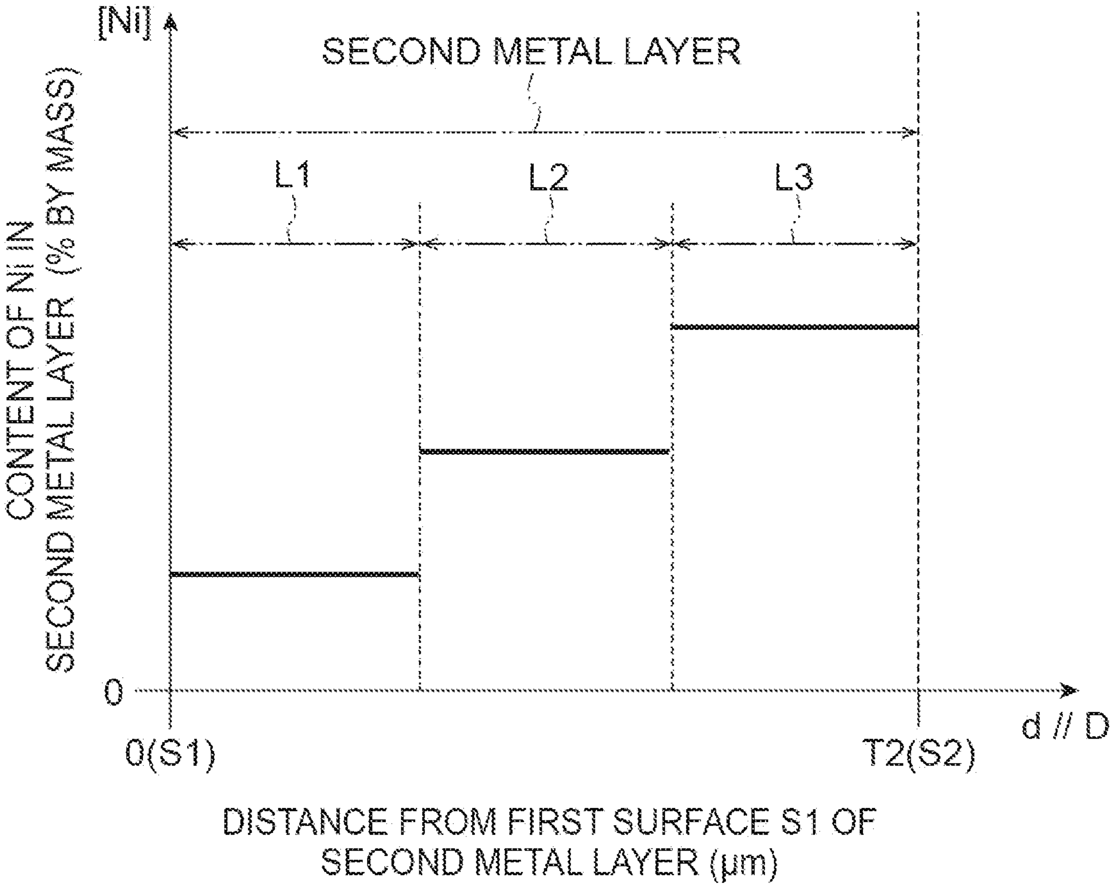
FIG. 3 is a graph showing another example of the distribution of the content of nickel in the second metal layer.

For example, when the number "n" of nickel-containing layers constituting the second metal layer 2 is 3, the second metal layer 2 consists of a first nickel-containing layer, a second nickel-containing layer, and a third nickel-containing layer. The first nickel-containing layer is laminated directly on the first metal layer 1, the second nickel-containing layer is laminated directly on the first nickel-containing layer, and the third nickel-containing layer is laminated directly on the second nickel-containing layer. A graph of FIG. 3 shows a distribution of a content of Ni in the second metal layer 2 when "n" is 3. A horizontal axis of the graph of FIG. 3 is the same as the horizontal axis of the graph of FIG. 2, and the vertical axis of the graph of FIG. 3 is the same as the vertical axis of the graph in FIG. 2. As shown in FIG. 3, a content of Ni in a third nickel-containing layer L3 is higher than a content of Ni in a second nickel-containing layer L2, and the content of Ni in the second nickel-containing layer L2 is higher than a content of Ni in a first nickel-containing layer L1. The content of Ni may be constant inside of each of the first nickel-containing layer L1, the second nickel-containing layer L2, and the third nickel-containing layer L3, and the content of Ni in the second metal layer 2 may increase stepwise along the thickness direction D.

Ni may be a main component of the second metal layer 2. That is, when the second metal layer 2 contains a plurality of kinds of elements, the content of Ni may be the highest. The content of Ni in the second metal layer 2 may be, for example, 60% by mass or more and less than 100% by mass, or 60% by mass or more and 99% by mass or less. When the second metal layer 2 contains three or more kinds of elements, the content of Ni in the second metal layer 2 may be less than 50% by mass. A part of the second metal layer 2 may be simple substance of Ni. At least a part or the whole of the second metal layer 2 may be an alloy containing Ni or an intermetallic compound containing Ni. When the content of Ni in the second metal layer 2 is within the above range, the laminated body 10 is likely to have a high tensile strength.

The content of Ni in the second metal layer 2 is the minimum in the vicinity of the first surface S1 of the second metal layer 2. The minimum value of the content of Ni in the second metal layer 2 is represented by $[Ni]_{MIN}$. The content of Ni in the second metal layer 2 is the maximum in the vicinity of the second surface S2 of the second metal layer 2. The maximum value of the content of Ni in the second metal layer 2 is represented by $[Ni]_{MAX}$. $\Delta[Ni]$ is defined as $[Ni]_{MAX}-[Ni]_{MIN}$. $\Delta[Ni]$ may be 1% by mass or more and 15% by mass or less, or 5% by mass or more and 12% by mass or less. When $\Delta[Ni]$ is within the above ranges, the laminated body 10 is likely to have a high tensile strength.

The second metal layer 2 may further contain at least one element (additive element) selected from the group consisting of phosphorus (P) and tungsten (W). Among all the elements constituting the second metal layer 2, all the elements other than Ni may be additive elements. Since a sum of contents of the additive elements in the second metal layer 2 decreases along the thickness direction D of the second metal layer 2, the content of Ni in the second metal layer 2 increases along the thickness direction D of the second metal layer 2. That is, the sum of contents of the additive elements in the second metal layer 2 is the highest in the vicinity of the first surface S1, decreases gradually or stepwise from the first surface S1 toward the second surface S2, and is the lowest in the vicinity of the second surface S2. The second metal layer 2 may further contain additive elements other than P and W. When the second metal layer 2 contains additive elements other than P and W, the second metal layer 2 does not have to contain P and W.

The second metal layer 2 may be formed by an electrolytic plating method or an electroless plating method. A heat treatment of the second metal layer 2 formed by the electrolytic plating method or the electroless plating method may be carried out. As shown in Examples described below, according to the electrolytic plating method or the electroless plating method, the content of Ni in the second metal layer 2 can be increased along the thickness direction D of the second metal layer 2. For example, control factors of the distribution of the content of Ni in the second metal layer 2 may be a composition of a plating solution, a content of each raw material and a proportion thereof in the plating solution, a temperature of the plating solution, a pH of the plating solution, a current density of the first metal layer 1, a duration time of the plating, and the like. The raw materials contained in the plating solution may be, for example, a compound containing Ni and compounds containing the above-described additive elements. As the content of the compound containing Ni in the plating solution used for forming each nickel-containing layer is larger, the content of Ni in each nickel-containing layer is higher. The second metal layer 2 consisting of a plurality of nickel-containing layers having different content of Ni may be formed by carrying out the plating method a plurality of times in which the above-described control factors are different. That is, the content of Ni in each of the plurality of nickel-containing layers constituting the second metal layer 2 may be controlled so that the content of Ni in the second metal layer 2 increases along the thickness direction D of the second metal layer 2. The second metal layer 2 in which the content of Ni increases along the thickness direction D may be formed by increasing a current density of the first metal layer continuously or stepwise along with the passage of time during the electrolytic plating.

Cu may be a main component of the first metal layer 1. The first metal layer 1 may consist of only Cu. The first metal layer 1 may consist of an alloy containing Cu. As the first metal layer 1 contains Cu, the laminated body 10 can have high conductivity that is required for a negative electrode current collector for a lithium ion secondary battery.

The negative electrode active material contained in the negative electrode active material layer 3 may be a material capable of intercalating and deintercalating lithium ions, and is not particularly limited. For example, the negative electrode active material contained in the negative electrode active material layer 3 may contain silicon (Si). The negative electrode active material containing silicon easily expands and contracts with charging and discharging of the lithium ion secondary battery, as compared with other negative electrode active materials. The laminated body 10 (second metal layer 2) is repeatedly subjected to the tensile stress due to the volume fluctuation of the negative electrode active material layer 3 associated with charging and discharging. However, since the laminated body 10 according to the present embodiment has a high tensile strength, breakage of the laminated body 10 due to the volume fluctuation of the negative electrode active material layer 3 is suppressed.

The negative electrode active material containing silicon may be simple substance of silicon, an alloy containing silicon, or a compound containing silicon (oxide, silicate, or the like). For example, the alloy containing silicon may contain at least one element selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr). For example, the compound containing silicon may contain at least one element selected from the group consisting of boron (B), nitrogen (N), oxygen (O), and carbon (C). For example, the negative electrode active material containing silicon may be at least one compound selected from the group consisting of $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, CusSi, $FeSi_2$, $MnSi_2$, $NbSi_2$, $TaSi_2$, $VSi_2$, $WSi_2$, $ZnSi_2$, SiC, $Si_2N_2$, $Si_2N_2O$, $SiO_X$ ($0<X\leq2$), and LiSiO. The negative electrode active material may be fibers (nanowires or the like) containing silicon, or particles (nanoparticles or the like) containing silicon. The negative electrode active material layer 3 may further contain a binder. The binder binds the negative electrode active materials to each other and binds the negative electrode active material layer 3 to the surface of the second metal layer 2.

A thickness T1 of the first metal layer 1 may be, for example, 1 μm or more and 8 μm or less. A thickness T2 of one second metal layer 2 may be, for example, 0.3 μm or more and 4 μm or less, or 1.0 μm or more and 2 μm or less. A total of the thicknesses T2 of a plurality of second metal layers 2 may be represented by $T2_{TOTAL}$, and $T2_{TOTAL}/T1$ may be 0.6 or more and 1.0 or less. For example, as shown in FIG. 1, when the laminated body 10 has two second metal layers 2, $T2_{TOTAL}$ is a total of the thicknesses of the two second metal layers 2. When $T2_{TOTAL}/T1$ is 0.6 or more, the laminated body 10 is likely to have a sufficiently high tensile strength. As $T2_{TOTAL}/T1$ is smaller, the raw material cost of the laminated body 10 (second metal layer 2) is suppressed. When $T2_{TOTAL}/T1$ is 1.0 or less, the lithium ion secondary battery containing the laminated body 10 is likely to have a sufficiently high energy density. Even when the second metal layer 2 constituting the laminated body 10 is only one layer, T2/T1 may be 0.6 or more and 1.0 or less for the same reason as described above. A thickness T3 of one negative electrode active material layer 3 may be, for example, 10 μm or more and 300 μm or less. Each of the thickness T1 of the first metal layer 1, the thickness T2 of the second metal layer 2, and the thickness T3 of the negative electrode active material layer 3 may be uniform.

Dimensions of each of the first metal layer 1, the second metal layer 2, and the negative electrode active material layer 3 in a direction perpendicular to a direction of lamination may be approximately equal to each other. For example, a width of each of the first metal layer 1, the second metal layer 2, and the negative electrode active material layer 3 in the direction perpendicular to the direction of lamination may be several tens mm or more and several hundreds mm or less. A length of each of the first metal layer 1, the second metal layer 2, and the negative electrode active material layer 3 in the direction perpendicular to the direction of lamination may be several tens mm or more and several thousands mm or less.

The present invention is not necessarily limited to the above-described embodiments. Various modifications of the present invention are possible to the extent that the gist of the present invention is maintained, and these modified examples are also included in the present invention.

For example, the second metal layer may be formed by a vapor deposition method. The vapor deposition method may be, for example, a metal organic physical vapor deposition method (MOPVD) such as sputtering, or a metal organic chemical vapor deposition method (MOCVD).

The laminated body according to the present invention may be used as a heat release material or an electromagnetic shielding material. Along with processing of the heat release material or the electromagnetic shielding material, the tensile stress acts on the heat release material or the electromagnetic shielding material. Since the laminated body according to the present invention has a high tensile strength, breakage of the heat release material or the electromagnetic shielding material along with the processing can be suppressed.

EXAMPLES

The present invention will be explained in detail by the following Examples and Comparative Examples. The present invention is not limited by the following Examples.

[Pretreatment of First Metal Layer]

A commercially available electrolytic copper foil was used as a first metal layer. A thickness of the first metal layer was 4.5 μm. The thickness of the first metal layer was uniform. The first metal layer was immersed in an acidic degreasing solution for 1 minute to remove organic matters adhering to the surface of the first metal layer. THRU-CUP MSC-3-A manufactured by C. Uyemura & Co., Ltd. was used as the degreasing solution. After degreasing, the first metal layer was immersed in pure water for 1 minute to wash the first metal layer.

After washing, the first metal layer was immersed in dilute sulfuric acid for 1 minute to remove the natural oxide film present on the surface of the first metal layer. A concentration of the dilute sulfuric acid was 10% by mass. After removing the natural oxide film, the first metal layer was immersed in pure water for 1 minute to wash the first metal layer.

A laminated body of each of Examples 1 to 13 and Comparative Examples 1 to 5 was produced by the following method using the first metal layer having undergone the above pretreatment.

Example 1

A second metal layer was formed on both surfaces of a first metal layer by the following electrolytic plating. That is, a laminated body consisted of a first metal layer and a second metal layer laminated on both surfaces of the first metal layer was formed by the electrolytic plating.

The second metal layer of Example 1 consisted of a first nickel-containing layer L1 laminated directly on the surface of the first metal layer, a second nickel-containing layer L2 laminated directly on the first nickel-containing layer L1, and a third nickel-containing layer L3 laminated directly on the second nickel-containing layer L2. The surface of the first nickel-containing layer L1 in contact with the first metal layer corresponds to the first surface of the second metal layer.

In the electrolytic plating, the first metal layer and another electrode connected to a power supply were immersed in a plating solution, and current was applied to the first metal layer and the other electrode. The plating solution contained nickel sulfate hexahydrate, sodium tungstate dihydrate, and trisodium citrate. A content of nickel sulfate hexahydrate in the plating solution was 60 g/L. A content of sodium tungstate dihydrate in the plating solution was 100 g/L. A content of trisodium citrate in the plating solution was 145 g/L. A pH of the plating solution was adjusted to 5.0. A temperature of the plating solution was adjusted to 50° C.

<Formation of First Nickel-Containing Layer L1>

The first nickel-containing layer L1 was formed on the surface of the first metal layer by adjusting a current density of the first metal layer to 2 A/dm$^2$ during electrolytic plating and continuing the electrolytic plating for 1.3 minutes.

<Formation of Second Nickel-Containing Layer L2>

The surface of the first nickel-containing layer L1 was washed by immersing the first metal layer on which the first nickel-containing layer L1 was formed in pure water for 1 minute, before forming the second nickel-containing layer L2.

The first metal layer on which the first nickel-containing layer L1 was formed was immersed in the plating solution together with another electrode. The second nickel-containing layer L2 was formed on the surface of the first nickel-containing layer L1 by adjusting a current density of the first metal layer to 3 A/dm$^2$ during electrolytic plating and continuing the electrolytic plating for 0.8 minutes.

<Formation of Third Nickel-Containing Layer L3>

The surface of the second nickel-containing layer L2 was washed by immersing the first metal layer on which the second nickel-containing layer L2 was formed in pure water for 1 minute, before forming the third nickel-containing layer L3.

The first metal layer on which the second nickel-containing layer L2 was formed was immersed in the plating solution together with another electrode. The third nickel-containing layer L3 was formed on the surface of the second nickel-containing layer L2 by adjusting a current density of the first metal layer to 5 A/dm$^2$ during electrolytic plating and continuing the electrolytic plating for 0.5 minutes.

The laminated body formed by the above plating method was immersed in pure water for 1 minute to wash the laminated body. After washing the laminated body, water adhering to the laminated body was removed. After removing water, the laminated body was heat-treated at 110° C. for 6 hours.

A laminated body of Example 1 was produced by the above method. In the case of Example 1, an exposed surface of the third nickel-containing layer L3 corresponds to the second surface of the second metal layer.

Example 2

In the case of Example 2, as the second metal layer, only the first nickel-containing layer L1 was formed on both surfaces of the first metal layer. In the process of forming the first nickel-containing layer L1 of Example 2, a current density of the first metal layer during the electrolytic plating was continuously increased from 2 A/dm$^2$ to 5 A/dm$^2$ with the lapse of time. A duration time of electrolytic plating of Example 2 was adjusted so that the integrated current of the first metal layer during electrolytic plating was the same as in Example 1.

A laminated body of Example 2 was produced by the same method as in Example 1 except for the above matters. In the case of Example 2, an exposed surface of the first nickel-containing layer L1 corresponds to the second surface of the second metal layer.

Example 3

In the process of forming the first nickel-containing layer L1 of Example 3, a current density of the first metal layer was adjusted to 2 A/dm$^2$, and electrolytic plating continued for 1.3 minutes.

In the process of forming the second nickel-containing layer L2 of Example 3, a current density of the first metal layer was adjusted to 3 A/dm$^2$, and electrolytic plating continued for 0.7 minutes.

In the process of forming the third nickel-containing layer L3 of Example 3, a current density of the first metal layer was adjusted to 4 A/dm$^2$, and electrolytic plating continued for 0.4 minutes.

In the case of Example 3, after washing the surface of the third nickel-containing layer L3 using pure water, a fourth nickel-containing layer L4 was formed on the surface of the third nickel-containing layer L3. That is, the second metal layer of Example 3 consisted of the first nickel-containing layer L1 laminated directly on the surface of the first metal layer, the second nickel-containing layer L2 laminated directly on the first nickel-containing layer L1, the third nickel-containing layer L3 laminated directly on the second nickel-containing layer L2, and the fourth nickel-containing layer L4 laminated directly on the third nickel-containing layer L3.

In the process of forming the fourth nickel-containing layer L4, a current density of the first metal layer was adjusted to 5 A/dm$^2$, and electrolytic plating continued for 0.2 minutes.

A laminated body of Example 3 was produced by the same method as in Example 1 except for the above matters. In the case of Example 3, an exposed surface of the fourth nickel-containing layer L4 corresponds to the second surface of the second metal layer.

Example 4

In the process of forming the first nickel-containing layer L1 of Example 4, a current density of the first metal layer was adjusted to 2 A/dm$^2$, and electrolytic plating continued for 5 minutes.

In the process of forming the second nickel-containing layer L2 of Example 4, a current density of the first metal layer was adjusted to 5 A/dm$^2$, and electrolytic plating continued for 0.5 minutes.

In the case of Example 4, the third nickel-containing layer L3 was not formed.

A laminated body of Example 4 was produced by the same method as in Example 1 except for the above matters. In the case of Example 4, an exposed surface of the second nickel-containing layer L2 corresponds to the second surface of the second metal layer.

Example 5

In the case of Example 5, the second metal layer was formed on both surfaces of the first metal layer by the following electroless plating instead of electrolytic plating. The second metal layer of Example 5 consisted of the first nickel-containing layer L1 laminated directly on the surface of the first metal layer, the second nickel-containing layer L2 laminated directly on the first nickel-containing layer L1, and the third nickel-containing layer L3 laminated directly on the second nickel-containing layer L2.

<Catalytic Treatment>

The surface of the first metal layer was subjected to a catalytic treatment before forming the first nickel-containing layer L1. In the catalytic treatment, the first metal layer was immersed in a catalytic treatment solution for 1 minute to deposit a catalyst (palladium sulfate) on the surface of the first metal layer. A temperature of the catalytic treatment solution was adjusted to 40° C. ACCEMULTA MNK-4-M manufactured by C. Uyemura & Co., Ltd. was used as the catalytic treatment solution.

<Formation of First Nickel-Containing Layer L1>

In the process of forming the first nickel-containing layer L1, the first metal layer was immersed in an electroless nickel plating solution. The electroless nickel plating solution used for forming the first nickel-containing layer L1 was ICP NICORON SOF manufactured by OKUNO Chemical Industries Co., Ltd. The electroless nickel plating solution contained sodium hypophosphite as a reducing agent. A temperature of the electroless nickel plating solution was adjusted to 85° C. A duration time of electroless plating was 2.5 minutes.

<Formation of Second Nickel-Containing Layer L2>

The surface of the first nickel-containing layer L1 was washed by immersing the first metal layer on which the first nickel-containing layer L1 was formed in pure water for 1 minute, before forming the second nickel-containing layer L2. The surface of the first nickel-containing layer L1 was subjected to a catalytic treatment after washing the surface of the first nickel-containing layer L1 and before forming the second nickel-containing layer L2.

In the process of forming the second nickel-containing layer L2, the first metal layer on which the first nickel-containing layer L1 was formed was immersed in an electroless nickel plating solution. The electroless nickel plating solution used for forming the second nickel-containing layer L2 was ICP NICORON GM manufactured by OKUNO Chemical Industries Co., Ltd. The electroless nickel plating solution contained sodium hypophosphite as a reducing agent. A temperature of the electroless nickel plating solution was adjusted to 80° C. A duration time of electroless plating was 2.5 minutes.

<Formation of Third Nickel-Containing Layer L3>

The surface of the second nickel-containing layer L2 was washed by immersing the first metal layer on which the second nickel-containing layer L2 was formed in pure water for 1 minute, before forming the third nickel-containing layer L3. The surface of the second nickel-containing layer L2 was subjected to a catalytic treatment after washing the surface of the second nickel-containing layer L2 and before forming the third nickel-containing layer L3.

In the process of forming the third nickel-containing layer L3, the first metal layer on which the second nickel-containing layer L2 was formed was immersed in an electroless nickel plating solution. The electroless nickel plating solution used for forming the third nickel-containing layer L3 was TOP NICORON LPH manufactured by OKUNO Chemical Industries Co., Ltd. The electroless nickel plating solution contained sodium hypophosphite as a reducing agent. A temperature of the electroless nickel plating solution was adjusted to 90° C. A duration time of electroless plating was 2 minutes. After forming the third nickel-containing layer L3, the laminated body was immersed in pure water for 1 minute to wash the laminated body.

A laminated body of Example 5 was produced by the above method. In the case of Example 5, an exposed surface of the third nickel-containing layer L3 corresponds to the second surface of the second metal layer.

Example 6

In the case of Example 6, the third nickel-containing layer L3 was not formed. A laminated body of Example 6 was produced by the same method as in Example 5 except for this matter. In the case of Example 6, an exposed surface of the second nickel-containing layer L2 corresponds to the second surface of the second metal layer.

Example 7

An electrolytic plating of Example 7 was carried out using a plating solution having a different composition from the plating solution of Example 1. The plating solution of Example 7 contained nickel sulfate hexahydrate, nickel chloride hexahydrate, boric acid, trisodium citrate, and sodium hydrogen phosphite. A content of nickel sulfate hexahydrate in the plating solution of Example 7 was 100 g/L. A content of nickel chloride hexahydrate in the plating solution of Example 7 was 30 g/L. A content of boric acid in the plating solution of Example 7 was 30 g/L. A content of trisodium citrate in the plating solution of Example 7 was 30 g/L. A content of sodium hydrogen phosphite in the plating solution of Example 7 was 20 g/L. A pH of the plating solution of Example 7 was adjusted to 3.5. A temperature of the plating solution of Example 7 was adjusted to 60° C.

In the case of Example 7, as the second metal layer, only the first nickel-containing layer L1 was formed on both surfaces of the first metal layer. In the process of forming the first nickel-containing layer L1 of Example 7, a current density of the first metal layer during electrolytic plating was continuously increased from 0.5 A/dm$^2$ to 4 A/dm$^2$ with the lapse of time. A duration time of electrolytic plating of Example 7 was adjusted so that the integrated current of the first metal layer during electrolytic plating was the same as in Example 5.

A laminated body of Example 7 was produced by the same method as in Example 1 except for the above matters. In the case of Example 7, an exposed surface of the first nickel-containing layer L1 corresponds to the second surface of the second metal layer.

Example 8

The first nickel-containing layer L1 of Example 8 was formed by electrolytic plating using a first plating solution having a different composition from the plating solution of Example 1.

A content of nickel sulfate hexahydrate in the first plating solution of Example 8 was 60 g/L. A content of sodium tungstate dihydrate in the first plating solution of Example 8 was 30 g/L. A content of trisodium citrate in the first plating solution of Example 8 was 80 g/L. A pH of the first plating solution of Example 8 was adjusted to 7.0. In the process of forming the first nickel-containing layer L1 of Example 8, a current density of the first metal layer was adjusted to 5 A/dm$^2$, and electrolytic plating continued for 1 minute.

The second nickel-containing layer L2 of Example 8 was formed by electrolytic plating using a second plating solution having a different composition from the plating solution of Example 1.

A content of nickel sulfate hexahydrate in the second plating solution of Example 8 was 70 g/L. A content of sodium tungstate dihydrate in the second plating solution of Example 8 was 15 g/L. A content of trisodium citrate in the second plating solution of Example 8 was 80 g/L. A pH of the second plating solution of Example 8 was adjusted to 7.0. In the process of forming the second nickel-containing layer L2 of Example 8, a current density of the first metal layer was adjusted to 5 A/dm$^2$, and electrolytic plating continued for 1 minute.

The third nickel-containing layer L3 of Example 8 was formed by electrolytic plating using a third plating solution having a different composition from the plating solution of Example 1.

A content of nickel sulfate hexahydrate in the third plating solution of Example 8 was 70 g/L. A content of sodium tungstate dihydrate in the third plating solution of Example 8 was 8 g/L. A content of trisodium citrate in the third plating solution of Example 8 was 80 g/L. A pH of the third plating solution of Example 8 was adjusted to 7.0. In the process of forming the third nickel-containing layer L3 of Example 8, a current density of the first metal layer was adjusted to 5 A/dm$^2$, and electrolytic plating continued for 1 minute.

A laminated body of Example 8 was produced by the same method as in Example 1 except for the above matters. In the case of Example 8, an exposed surface of the third nickel-containing layer L3 corresponds to the second surface of the second metal layer.

Example 9

The first nickel-containing layer L1 of Example 9 was formed by electrolytic plating using a first plating solution having a different composition from the plating solution of Example 1.

A content of nickel sulfate hexahydrate in the first plating solution of Example 9 was 30 g/L. A content of sodium tungstate dihydrate in the first plating solution of Example 9 was 60 g/L. A content of trisodium citrate in the first plating solution of Example 9 was 80 g/L. A pH of the first plating solution of Example 9 was adjusted to 7.0. In the process of forming the first nickel-containing layer L1 of Example 9, a current density of the first metal layer was adjusted to 5 A/dm$^2$, and electrolytic plating continued for 3 minutes.

The second nickel-containing layer L2 of Example 9 was formed by electrolytic plating using a second plating solution having a different composition from the plating solution of Example 1.

A content of nickel sulfate hexahydrate in the second plating solution of Example 9 was 40 g/L. A content of sodium tungstate dihydrate in the second plating solution of Example 9 was 45 g/L. A content of trisodium citrate in the second plating solution of Example 9 was 80 g/L. A pH of the second plating solution of Example 9 was adjusted to 7.0. In the process of forming the second nickel-containing layer L2 of Example 9, a current density of the first metal layer was adjusted to 5 A/dm$^2$, and electrolytic plating continued for 3 minutes.

In the case of Example 9, the third nickel-containing layer L3 was not formed.

A laminated body of Example 9 was produced by the same method as in Example 1 except for the above matters. In the case of Example 9, an exposed surface of the second nickel-containing layer L2 corresponds to the second surface of the second metal layer.

Example 10

The first nickel-containing layer L1 of Example 10 was formed by electrolytic plating using a first plating solution having a different composition from the plating solution of Example 1.

A content of nickel sulfate hexahydrate in the first plating solution of Example 10 was 70 g/L. A content of sodium tungstate dihydrate in the first plating solution of Example 10 was 15 g/L. A content of trisodium citrate in the first plating solution of Example 10 was 80 g/L. A pH of the first plating solution of Example 10 was adjusted to 7.0. In the process of forming the first nickel-containing layer L1 of Example 10, a current density of the first metal layer was adjusted to 5 A/dm$^2$, and electrolytic plating continued for 2 minutes.

The second nickel-containing layer L2 of Example 10 was formed by electrolytic plating using a second plating solution having a different composition from the plating solution of Example 1.

A content of nickel sulfate hexahydrate in the second plating solution of Example 10 was 70 g/L. A content of sodium tungstate dihydrate in the second plating solution of Example 10 was 8 g/L. A content of trisodium citrate in the second plating solution of Example 10 was 80 g/L. A pH of the second plating solution of Example 10 was adjusted to 7.0. In the process of forming the second nickel-containing layer L2 of Example 10, a current density of the first metal layer was adjusted to 5 A/dm$^2$, and electrolytic plating continued for 1 minute.

The third nickel-containing layer L3 of Example 10 was formed by electrolytic plating using a third plating solution having a different composition from the plating solution of Example 1.

A content of nickel sulfate hexahydrate in the third plating solution of Example 10 was 70 g/L. A content of sodium tungstate dihydrate in the third plating solution of Example 10 was 4 g/L. A content of trisodium citrate in the third plating solution of Example 10 was 80 g/L. A pH of the third plating solution of Example 10 was adjusted to 7.0. In the process of forming the third nickel-containing layer L3 of Example 10, a current density of the first metal layer was adjusted to 5 A/dm$^2$, and electrolytic plating continued for 1 minute.

A laminated body of Example 10 was produced by the same method as in Example 1 except for the above matters. In the case of Example 10, an exposed surface of the third nickel-containing layer L3 corresponds to the second surface of the second metal layer.

Example 11

In the case of Example 11, the first nickel-containing layer L1 and the second nickel-containing layer L2 were formed by only one electrolytic plating described below.

A content of nickel sulfate hexahydrate in the plating solution of Example 11 was 80 g/L. A content of sodium tungstate dihydrate in the plating solution of Example 11 was 5 g/L. A content of trisodium citrate in the plating solution of Example 11 was 80 g/L. A pH of the plating solution of Example 11 was adjusted to 7.0. A current density of the first metal layer during electrolytic plating in Example 11 was adjusted to 5 A/dm$^2$. Electrolytic plating of Example 11 continued for 3 minutes. During electrolytic plating of Example 11, the plating bath was stationary without being swung.

Although the reason why two layers differing in a content of nickel were formed in Example 11 is not clear, it is considered that the first nickel-containing layer L1 and the second nickel-containing layer L2 were formed by the following mechanism.

The content of sodium tungstate dihydrate in the plating solution of Example 11 was adjusted to be lower than that in the plating solution of Example 1. Due to plating deposition, a concentration of the tungsten component locally decreases near an object to be plated. However, since the content of sodium tungstate dihydrate in the plating solution of Example 11 was lower than that in the plating solution of Example 1, the concentration gradient of the tungsten component near the object to be plated was remarkably suppressed. Therefore, the supply of the tungsten component to the second metal layer was suppressed. Further, since the object to be plated was kept stationary without being swung, the stirring effect due to swinging the plating solution was suppressed, and the supply of the tungsten component to the second metal layer was further suppressed. As a result, after the first nickel-containing layer L1 having a relatively large content of tungsten was formed at the initial stage of plating, the second nickel-containing layer L2 having a relatively small content of tungsten was formed.

In the case of Example 11, the third nickel-containing layer L3 was not formed.

A laminated body of Example 11 was produced by the same method as in Example 1 except for the above matters. In the case of Example 11, an exposed surface of the second nickel-containing layer L2 corresponds to the second surface of the second metal layer.

Example 12

In the case of Example 12, the first nickel-containing layer L1 and the second nickel-containing layer L2 were formed by only one electrolytic plating described below.

A content of nickel sulfate hexahydrate in the plating solution of Example 12 was 80 g/L. A content of sodium tungstate dihydrate in the plating solution of Example 12 was 3 g/L. A content of trisodium citrate in the plating solution of Example 12 was 80 g/L. A pH of the plating solution of Example 12 was adjusted to 7.0. A current density of the first metal layer during electrolytic plating in Example 12 was adjusted to 5 A/dm$^2$. Electrolytic plating of Example 12 continued for 3 minutes. During electrolytic plating of Example 12, the plating bath was stationary without being swung.

The content of sodium tungstate dihydrate in the plating solution of Example 12 was adjusted to be lower than the content of sodium tungstate dihydrate in the plating solution of Example 11. As a result, after the first nickel-containing layer L1 containing tungsten was formed at the initial stage of plating, the second nickel-containing layer L2 not containing tungsten was formed.

In the case of Example 12, the third nickel-containing layer L3 was not formed.

A laminated body of Example 12 was produced by the same method as in Example 1 except for the above matters. In the case of Example 12, an exposed surface of the second nickel-containing layer L2 corresponds to the second surface of the second metal layer.

Example 13

In the case of Example 13, the first nickel-containing layer L1 and the second nickel-containing layer L2 were formed by only one electrolytic plating described below.

A content of nickel sulfate hexahydrate in the plating solution of Example 13 was 80 g/L. A content of sodium tungstate dihydrate in the plating solution of Example 13 was 1 g/L. A content of trisodium citrate in the plating solution of Example 13 was 80 g/L. A pH of the plating solution of Example 13 was adjusted to 7.0. A current density of the first metal layer during electrolytic plating in Example 13 was adjusted to 5 A/dm$^2$. Electrolytic plating of Example 13 continued for 3 minutes. During electrolytic plating of Example 13, the plating bath was stationary without being swung.

Similarly to Example 12, the content of sodium tungstate dihydrate in the plating solution of Example 13 was adjusted to be lower than the content of sodium tungstate dihydrate in the plating solution of Example 11. As a result, after the first nickel-containing layer L1 containing tungsten was formed at the initial stage of plating, the second nickel-containing layer L2 not containing tungsten was formed.

In the case of Example 13, the third nickel-containing layer L3 was not formed.

A laminated body of Example 13 was produced by the same method as in Example 1 except for the above matters. In the case of Example 13, an exposed surface of the second nickel-containing layer L2 corresponds to the second surface of the second metal layer.

Comparative Example 1

In the case of Comparative Example 1, as the second metal layer, only the first nickel-containing layer L1 was formed on both surfaces of the first metal layer.

Electrolytic plating of Comparative Example 1 was carried out using a plating solution having a different composition from the plating solution of Example 1. The plating solution of Comparative Example 1 contained nickel sulfate hexahydrate, nickel chloride hexahydrate, and boric acid. A content of nickel sulfate hexahydrate in the plating solution of Comparative Example 1 was 240 g/L. A content of nickel chloride hexahydrate in the plating solution of Comparative Example 1 was 45 g/L. A content of boric acid in the plating solution of Comparative Example 1 was 30 g/L. A pH of the plating solution was adjusted to 4.2. A temperature of the plating solution was adjusted to 40° C.

In the process of forming the first nickel-containing layer L1 of Comparative Example 1, a current density of the first metal layer during electrolytic plating was adjusted to 5 $A/dm^2$, and electrolytic plating continued for 1.5 minutes.

A laminated body of Comparative Example 1 was produced by the same method as in Example 1 except for the above matters. In the case of Comparative Example 1, an exposed surface of the first nickel-containing layer L1 corresponds to the second surface of the second metal layer.

Comparative Example 2

In the case of Comparative Example 2, as the second metal layer, only the first nickel-containing layer L1 was formed on both surfaces of the first metal layer.

In the case of Comparative Example 2, the first nickel-containing layer L1 was formed on the surface of the first metal layer by adjusting a current density of the first metal layer to 5 $A/dm^2$ during electrolytic plating and continuing electrolytic plating for 2 minutes.

A laminated body of Comparative Example 2 was produced by the same method as in Example 1 except for the above matters. In the case of Comparative Example 2, an exposed surface of the first nickel-containing layer L1 corresponds to the second surface of the second metal layer.

Comparative Example 3

In the case of Comparative Example 3, as the second metal layer, only the first nickel-containing layer L1 was formed on both surfaces of the first metal layer.

In the process of forming the first nickel-containing layer L1 of Comparative Example 3, a duration time of electroless plating was 7 minutes.

A laminated body of Comparative Example 3 was produced by the same method as in Example 5 except for the above matters. In the case of Comparative Example 3, an exposed surface of the first nickel-containing layer L1 corresponds to the second surface of the second metal layer.

Comparative Example 4

In the process of forming the first nickel-containing layer L1 of Comparative Example 4, a duration time of electroless plating was 15 minutes.

A laminated body of Comparative Example 4 was produced by the same method as in Comparative Example 3 except for the above matters. In the case of Comparative Example 4, an exposed surface of the first nickel-containing layer L1 corresponds to the second surface of the second metal layer.

Comparative Example 5

In the process of forming the first nickel-containing layer L1 of Comparative Example 5, a current density of the first metal layer during electrolytic plating was adjusted to 5 $A/dm^2$, and electrolytic plating continued for 0.2 minutes.

In the process of forming the second nickel-containing layer L2 of Comparative Example 5, a current density of the first metal layer was adjusted to 4 $A/dm^2$ during electrolytic plating, and electrolytic plating continued for 0.4 minutes.

In the process of forming the third nickel-containing layer L3 of Comparative Example 5, a current density of the first metal layer was adjusted to 3 $A/dm^2$ during electrolytic plating, and electrolytic plating was continued for 0.7 minutes.

A laminated body of Comparative Example 5 was produced by the same method as in Example 1 except for the above matters. In the case of Comparative Example 5, an exposed surface of the third nickel-containing layer L3 corresponds to the second surface of the second metal layer.

[Analysis of Laminated Body]

The laminated body of each of Examples 1 to 13 and Comparative Examples 1 to 5 was analyzed by the following methods.

The laminated body was cut in a direction of lamination (direction perpendicular to the first surface of the second metal layer). A cross-section of the laminated body was observed with a scanning electron microscope (SEM). A composition of the second metal layer exposed at the cross-section of the laminated body was analyzed by energy dispersive X-ray spectroscopy (EDS) along a thickness direction D of the second metal layer.

It was confirmed that the second metal layer of each of Examples 1 to 13 and Comparative Examples 1 to 5 contained constituent elements shown in Table 1 below.

A content [Ni] of Ni in each nickel-containing layer constituting the second metal layer of each of Examples 1 to 13 and Comparative Examples 1 to 5 is shown in Table 1 below. L1 in Table 1 means the first nickel-containing layer. L2 in Table 1 means the second nickel-containing layer. L3 in Table 1 means the third nickel-containing layer. L4 in Table 1 means the fourth nickel-containing layer. The content [Ni] of Ni in each nickel-containing layer was substantially constant, except for Examples 2 and 7.

In the cases of Examples 2 and 7, the content [Ni] of Ni in the second metal layer (first nickel-containing layer L1) increased continuously along the thickness direction D of the second metal layer. That is, in the cases of Examples 2 and 7, the content of Ni in the second metal layer was the minimum in the vicinity of the first surface of the second metal layer and the maximum in the vicinity of the second surface of the second metal layer.

In the case of Example 2, the minimum value of the content of Ni in the second metal layer was 62% by mass, and the maximum value of the content of Ni in the second metal layer was 69% by mass.

In the case of Example 7, the minimum value of the content of Ni in the second metal layer was 87% by mass, and the maximum value of the content of Ni in the second metal layer was 99% by mass.

Δ[Ni] of each of Examples 1 to 13 and Comparative Example 5 is shown in Table 1 below. The definition of Δ[Ni] is as described above.

In all cases of Examples 1 to 13 and Comparative Examples 1 to 5, the thickness of each nickel-containing layer constituting the second metal layer was uniform. The thickness of each nickel-containing layer was measured in the cross-section of the laminated body. The thickness of each nickel-containing layer is shown in Table 1 below.

[Bending Test]

Figure 4:
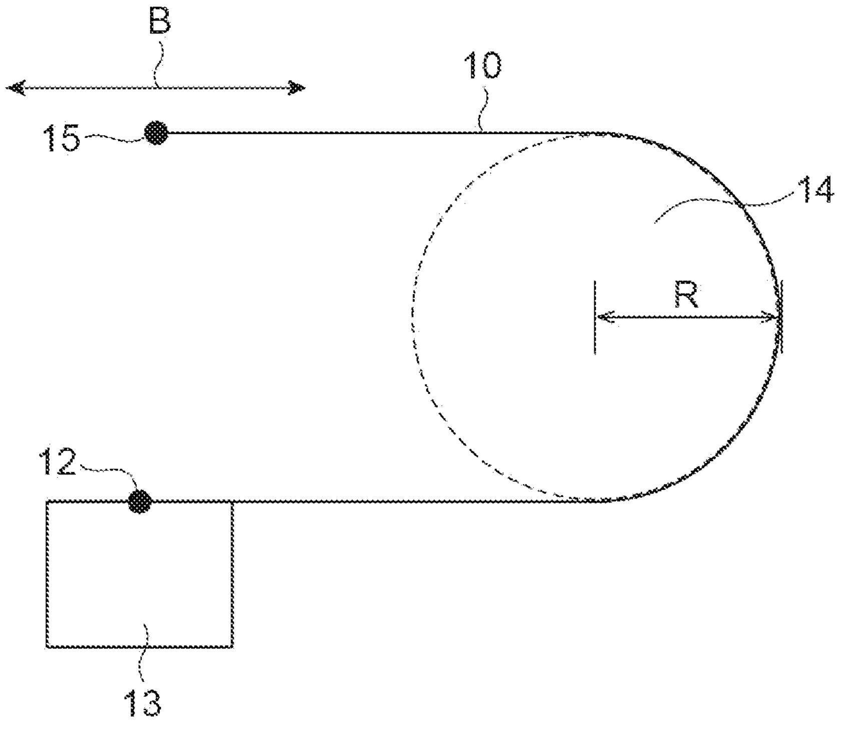
FIG. 4 is a schematic view illustrating an outline of a bending test for evaluating a tensile strength of the laminated body.

The following bending test according to JISC5016 was carried out using the laminated body of each of Examples 1 to 13 and Comparative Examples 1 to 5. An outline of the bending test is shown in FIG. 4.

A shape of the laminated body 10 used for the bending test was a rectangular shape. A length of the long side of the laminated body 10 (length of the laminated body 10 in a direction perpendicular to the direction of lamination) was 150 mm. A length of the short side of the laminated body 10 (width of the laminated body in the direction perpendicular to the direction of lamination) was 50 mm.

A cylindrical body 14 harder than the laminated body 10 was used for the bending test. A height of the cylindrical body 14 was larger than the length of the short side of the laminated body 10. A curvature radius R of an outer peripheral surface of the cylindrical body 14 was 5 mm.

The outer peripheral surface of the cylindrical body 14 was in contact with the central part of the laminated body 10 in the long side direction of the laminated body 10 so that the height direction of the cylindrical body 14 was parallel to the short side of the laminated body 10. The laminated body 10 was folded so that the surface of the laminated body 10 (the second surface of the second metal layer) was in close contact with the outer peripheral surface of the cylindrical body 14. One edge 12 of the folded laminated body 10 was fixed to a jig 13. The other edge 15 of the folded laminated body 10 was repeatedly reciprocated along a direction B (the long side direction of the laminated body 10) for 1 minute. A distance of the reciprocating movement of the edge 15 was 30 mm. The reciprocating cycle was 150 times/minute.

After the edge 15 of the laminated body 10 was repeatedly reciprocated for 1 minute, a surface resistivity SR (unit: Ω/sq) was measured in a part (the second surface of the second metal layer), which had been in contact with the outer peripheral surface of the cylindrical body 14, of the laminated body 10. The surface resistivity SR was measured by a four-terminal method. A surface resistivity $SR_0$ was also measured before the above bending test. A part where $SR_0$ was measured before the bending test was the same as the part where SR was measured. A surface resistance increase rate ΔSR (unit: %) defined by Equation 1 below was calculated.

$$\Delta SR = 100 \times (SR - SR_0)/SR_0 \quad (1)$$

In the above bending test, a tensile stress acts on the surface (the second surface of the second metal layer), which is in close contact with the outer peripheral surface of the cylindrical body 14, of the laminated body 10. As the number of cracks formed in the laminated body 10 (second metal layer) due to the tensile stress is larger and a cross-sectional area formed by the cracks is larger, the surface resistance increase rate ΔSR is higher. In other words, as the tensile strength of the laminated body 10 is higher, cracks in the laminated body 10 (second metal layer) are easier to be suppressed, and the surface resistance increase rate ΔSR is lower.

Results of the bending test of each of Examples 1 to 13 and Comparative Examples 1 to 5 described above are shown in Table 1 below. “A” in Table 1 means that the surface resistance increase rate ΔSR is 0% or more and less than 5%. “B” in Table 1 means that the surface resistance increase rate ΔSR is 5% or more and less than 10%. “C” in Table 1 means that the surface resistance increase rate ΔSR is 10% or more and less than 15%. “D” in Table 1 means that the surface resistance increase rate ΔSR is 15% or more.

TABLE 1

| Unit | Constituent element — | L1 Thickness µm | L1 [Ni] mass % | L2 Thickness µm | L2 [Ni] mass % | L3 Thickness µm | L3 [Ni] mass % | L4 Thickness µm | L4 [Ni] mass % | Δ[Ni] mass % | Bending test — |
|---|---|---|---|---|---|---|---|---|---|---|---|
| Example 1 | Ni. W | 0.5 | 61 | 0.5 | 65 | 0.5 | 67 | — | — | 6 | A |
| Example 2 | Ni, W | 2.0 | 62→69 | — | — | — | — | — | — | 7 | A |
| Example 3 | Ni, W | 0.5 | 60 | 0.4 | 63 | 0.3 | 66 | 0.2 | 68 | 8 | B |
| Example 4 | Ni, W | 1.0 | 61 | 0.5 | 67 | — | — | — | — | 6 | B |
| Example 5 | Ni, P | 0.5 | 88 | 0.5 | 93 | 0.5 | 99 | — | — | 11 | C |
| Example 6 | Ni, P | 0.5 | 88 | 0.5 | 93 | — | — | — | — | 5 | B |
| Example 7 | Ni, P | 1.5 | 87→99 | — | — | — | — | — | — | 12 | B |
| Example 8 | Ni, W | 0.5 | 80 | 0.5 | 90 | 0.4 | 95 | — | — | 15 | C |
| Example 9 | Ni, W | 0.8 | 60 | 0.7 | 70 | — | — | — | — | 10 | B |
| Example 10 | Ni, W | 0.8 | 90 | 0.4 | 95 | 0.4 | 98 | — | — | 8 | A |
| Example 11 | Ni, W | 0.8 | 97 | 0.8 | 98 | — | — | — | — | 1 | B |
| Example 12 | Ni, W | 0.9 | 97 | 0.4 | 100 | — | — | — | — | 3 | A |
| Example 13 | Ni, W | 0.8 | 99 | 0.8 | 100 | — | — | — | — | 1 | B |
| Comparative Example 1 | Ni | 1.5 | 100 | — | — | — | — | — | — | — | D |
| Comparative Example 2 | Ni, W | 2.0 | 67 | — | — | — | — | — | — | — | D |
| Comparative Example 3 | Ni, P | 1.5 | 88 | — | — | — | — | — | — | — | D |
| Comparative Example 4 | Ni, P | 3.6 | 88 | — | — | — | — | — | — | — | D |
| Comparative Example 5 | Ni, W | 0.5 | 67 | 0.5 | 65 | 0.5 | 61 | — | — | 6 | D |

INDUSTRIAL APPLICABILITY

For example, the laminated body according to one aspect of the present invention may be used for a negative electrode current collector of a lithium ion secondary battery.

REFERENCE SIGNS LIST

1: first metal layer, 2: second metal layer, 3: negative electrode active material layer, 10: laminated body (current collector), 20: negative electrode, D: thickness direction of second metal layer, S1: first surface of second metal layer, S2: second surface of second metal layer.

The invention claimed is:

1. A laminated body comprising:

a first metal layer containing copper; and a second metal layer containing nickel and laminated directly on the first metal layer, wherein a first surface of the second metal layer is a surface in contact with the first metal layer, a second surface of the second metal layer is a reverse surface of the first surface, a thickness direction of the second metal layer is a direction approximately perpendicular to the first surface and oriented from the first surface toward the second surface, a unit of a content of nickel in the second metal layer is % by mass, the content of nickel in the second metal layer increases along the thickness direction, and wherein a thickness of the first metal layer is represented by T1, a thickness of the second metal layer is represented by T2, and T2/T1 is 0.6 or more and 1.0 or less.

2. The laminated body according to claim 1, wherein the second metal layer further contains at least one element selected from the group consisting of phosphorus and tungsten.

3. The laminated body according to claim 1, wherein the second metal layer consists of a plurality of nickel-containing layers laminated in the thickness direction, and a content of nickel in each of the plurality of nickel-containing layers is different from each other.

4. The laminated body according to claim 1, wherein the content of nickel in the second metal layer is the lowest in the vicinity of the first surface, increases stepwise along the thickness direction, and is the highest in the vicinity of the second surface.

5. The laminated body according to claim 1, wherein the content of nickel in the second metal layer is the lowest in the vicinity of the first surface, increases continuously along the thickness direction, and is the highest in the vicinity of the second surface.

6. A negative electrode current collector for a lithium ion secondary battery, the negative electrode current collector comprising the laminated body according to claim 1.

7. A negative electrode for a lithium ion secondary battery, the negative electrode comprising:

the negative electrode current collector according to claim 6; and a negative electrode active material layer containing a negative electrode active material, wherein the negative electrode active material layer is laminated directly on the second surface of the second metal layer.

8. The negative electrode according to claim 7, wherein the negative electrode active material contains silicon.

* * * * *